(12) United States Patent
Foutz

(10) Patent No.: US 12,276,377 B2
(45) Date of Patent: Apr. 15, 2025

(54) MODULAR MOUNTING SYSTEM

(71) Applicant: Greg Foutz, Mesa, AZ (US)

(72) Inventor: Greg Foutz, Mesa, AZ (US)

( * ) Notice: Subject to any disclaimer, the term of this patent is extended or adjusted under 35 U.S.C. 154(b) by 0 days.

(21) Appl. No.: 18/582,878

(22) Filed: Feb. 21, 2024

(65) Prior Publication Data
US 2024/0255099 A1    Aug. 1, 2024

Related U.S. Application Data

(62) Division of application No. 17/389,750, filed on Jul. 30, 2021, now Pat. No. 11,940,092.

(60) Provisional application No. 63/082,133, filed on Sep. 23, 2020.

(51) Int. Cl.
F16M 13/02    (2006.01)

(52) U.S. Cl.
CPC ................... F16M 13/022 (2013.01)

(58) Field of Classification Search
CPC ... F16M 13/022; F41C 33/041; F41C 33/046; A45F 5/00; A45F 5/02; A45F 3/06; A45F 3/08; Y10T 24/45984; Y10T 24/44043; Y10T 24/44256; Y10T 24/13; Y10T 24/4599; Y10S 24/44; Y10S 24/38
See application file for complete search history.

(56) References Cited

U.S. PATENT DOCUMENTS

| | | | | |
|---|---|---|---|---|
| 5,724,707 A * | 3/1998 | Kirk | ........................... | A45F 5/02 224/675 |
| 8,438,811 B1 * | 5/2013 | Woodard | ................ | F41C 33/06 52/506.05 |
| 9,173,436 B2 * | 11/2015 | Crye | ......................... | A45F 3/14 |
| 9,521,897 B2 * | 12/2016 | Thompson | ................ | A45F 5/02 |
| 9,664,481 B2 * | 5/2017 | Alcantra | .................. | A41D 1/04 |
| 9,797,679 B2 * | 10/2017 | Ponder | .................. | F41C 33/001 |
| D820,003 S * | 6/2018 | Capdepon | ...................... | D6/553 |
| 10,070,699 B2 * | 9/2018 | Bowerman | ............... | A45F 3/00 |
| 10,080,423 B1 * | 9/2018 | Bandlow | ............... | F41C 33/008 |
| 10,143,294 B1 * | 12/2018 | Matson | ..................... | A45F 5/02 |
| 10,863,817 B2 * | 12/2020 | Yeates | .................. | F41C 33/046 |
| 11,029,126 B1 * | 6/2021 | Silva | ..................... | F41C 33/046 |
| 11,064,796 B1 * | 7/2021 | Blauer | .................. | F16B 5/0664 |
| 11,085,578 B2 * | 8/2021 | Roth | ..................... | H04B 1/385 |
| 11,118,723 B2 * | 9/2021 | Mooney | ................. | F16M 11/14 |
| 11,143,487 B1 * | 10/2021 | Reich | ................. | F41C 33/0263 |
| 11,272,779 B2 * | 3/2022 | Grinnell | ..................... | A45F 5/02 |
| 11,293,479 B2 * | 4/2022 | Bowerman | ............ | F16B 45/06 |
| 11,388,980 B2 * | 7/2022 | Yeates | .................. | F41C 33/046 |
| 11,470,950 B2 * | 10/2022 | Hawkins | ................ | A45F 5/021 |
| 11,517,102 B2 * | 12/2022 | Yeates | ...................... | A45F 3/04 |
| 11,530,897 B2 * | 12/2022 | Smith | ...................... | A45F 5/02 |

(Continued)

*Primary Examiner* — Patrick D Hawn

(74) *Attorney, Agent, or Firm* — Hartman Titus PLC; Joseph W Mott

(57) ABSTRACT

A modular mounting system includes a panel with a hexagonal array of primary apertures each of which has at least three planes of symmetry. Each of the primary apertures is separated from an adjacent primary aperture by a secondary aperture comprising an elongated opening having a length that is greater than the width of a PALS strap. A mounting system comprising a backing plate, an optional separate indexing plate and a front mounting bracket can be assembled to the panel to provide a rigid attachment between the equipment and the panel.

4 Claims, 8 Drawing Sheets

(56) References Cited

U.S. PATENT DOCUMENTS

| | | | | |
|---|---|---|---|---|
| 2011/0137336 A1* | 6/2011 | Holcomb | ............ | A61B 17/1322 |
| | | | | 606/203 |
| 2012/0045929 A1* | 2/2012 | Streeter | .................... | A45F 5/00 |
| | | | | 439/492 |
| 2012/0174341 A1* | 7/2012 | Rogers | ................. | F41C 33/041 |
| | | | | 24/3.1 |
| 2013/0047386 A1* | 2/2013 | Barfoot | ................ | A47F 5/0838 |
| | | | | 24/580.1 |
| 2013/0126566 A1* | 5/2013 | Seuk | ........................ | A45F 5/00 |
| | | | | 224/223 |
| 2013/0193179 A1* | 8/2013 | Davidson | ............... | B60R 7/043 |
| | | | | 224/584 |
| 2014/0325803 A1* | 11/2014 | Iannello | .................... | A45F 5/00 |
| | | | | 24/485 |
| 2017/0127812 A1* | 5/2017 | Alcantra | .............. | F41C 33/046 |
| 2017/0307335 A1* | 10/2017 | Skifstad | ................ | F41C 33/041 |
| 2019/0092213 A1* | 3/2019 | Beenen | ................ | B60P 7/0807 |
| 2020/0003525 A1* | 1/2020 | LeMarbe | ................ | F42B 39/02 |
| 2022/0061506 A1* | 3/2022 | Woodward | ............... | A45F 3/14 |

\* cited by examiner

MODULAR MOUNTING SYSTEM

CROSS-REFERENCE TO RELATED APPLICATIONS

This application is a divisional of application Ser. No. 17/389,750, the entirety of which is hereby incorporated by reference.

BACKGROUND OF THE INVENTION

This invention relates generally to modular tactical/law enforcement gear and, in particular, to modular lightweight load bearing equipment (MOLLE).

MOLLE is an acronym that refers to the modular backpacks, rucksacks, vests and other equipment currently deployed by the US Army and several of its NATO allies. Because of its ubiquitous nature, MOLLE equipment is also used frequently by law enforcement and civilian outdoorsmen. Modularity between the various pieces of MOLLE equipment is achieved because each piece of equipment is made to conform to the Pouch Attachment Ladder System (PALS). The PALS system comprises a grid consisting of horizontal rows of 25 mm (1 in) Type Ill nylon webbing stitched to the rucksack, pouch, vest or other equipment. The rows of webbing are spaced 25 mm apart vertically and are stitched to the piece of equipment along a vertical seam at 38 mm (1.5 in) intervals. This forms a series of tight loops spaced at 38 mm across the surface of the equipment. One piece of equipment, for example a pouch, is attached to another piece of equipment, for example a rucksack, by threading one or more 25 mm wide nylon straps attached to the pouch, alternatingly through the loops on the rucksack and pouch, from top to bottom, then closing the end of the strap with a button, snap, hook and loop or other conventional attachment. The essence of PALS is that all of the equipment is standardized to 25 mm wide webbing and 38 mm center-to-center spacing of the attachment loops.

PALS compatible mounting systems are not limited to wearable fabric equipment. U.S. Pat. No. 8,438,811 discloses a flexible panel that is attached to the rear surface of a vehicle seat back. PALS compatible pouches and the like are attached to the flexible panel by weaving a one or more straps attached to the pouch alternatingly through the loops in the flexible panel and closing the end of the strap in a manner similar to that described above. U.S. Pat. No. 9,723,909 discloses a rigid or semi-rigid panel having a hexagonal array of hexagonal holes. The sides of the hexagonal holes are at least 25 mm across so that a PALS strap can be passed through the holes while remaining flat. In both of the aforementioned patents, however, the equipment is secured to the panel by the PALS strap(s) alone, and therefore heavy equipment, such as a rifle, may not be secured sufficiently to avoid jostling against its restraints, especially if used on an off-road vehicle. What is needed and what the prior art lacks is a PALS compatible mounting system that is capably of rigidly securing heavy equipment such as a rifle or shotgun while maintaining compatibility with other MOLLE equipment employing PALS straps to secure the equipment.

SUMMARY OF THE INVENTION

The present invention comprises a modular mounting system. In an illustrative embodiment of the invention, the modular mounting system includes a panel with a hexagonal array of primary apertures each of which has at least three planes of symmetry. Each of the primary apertures is separated from an adjacent primary aperture by a secondary aperture comprising an elongated opening having a length that is greater than the width of a PALS strap. A mounting system comprising a backing plate, an optional separate indexing plate and a front mounting bracket can be assembled to the panel to provide a rigid attachment between the equipment and the panel.

BRIEF DESCRIPTION OF DRAWINGS

The present invention will be better understood from a reading of the following detailed description, taken in conjunction with the accompanying drawing figures in which like references designate like elements and, in which.

DETAILED DESCRIPTION OF THE INVENTION

Figure 1:
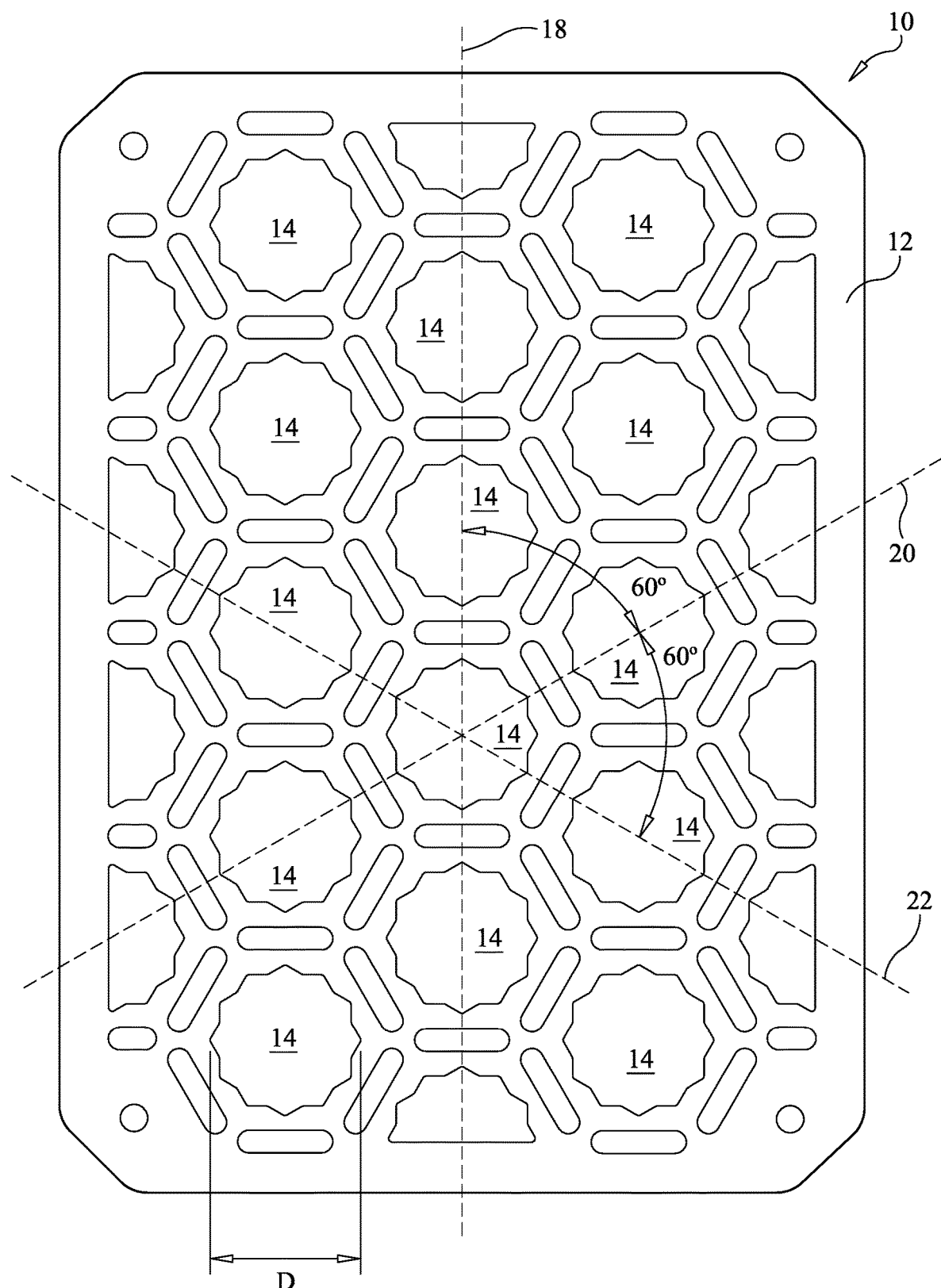
FIG. 1 is a front view of an attachment member used in a modular mounting system incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
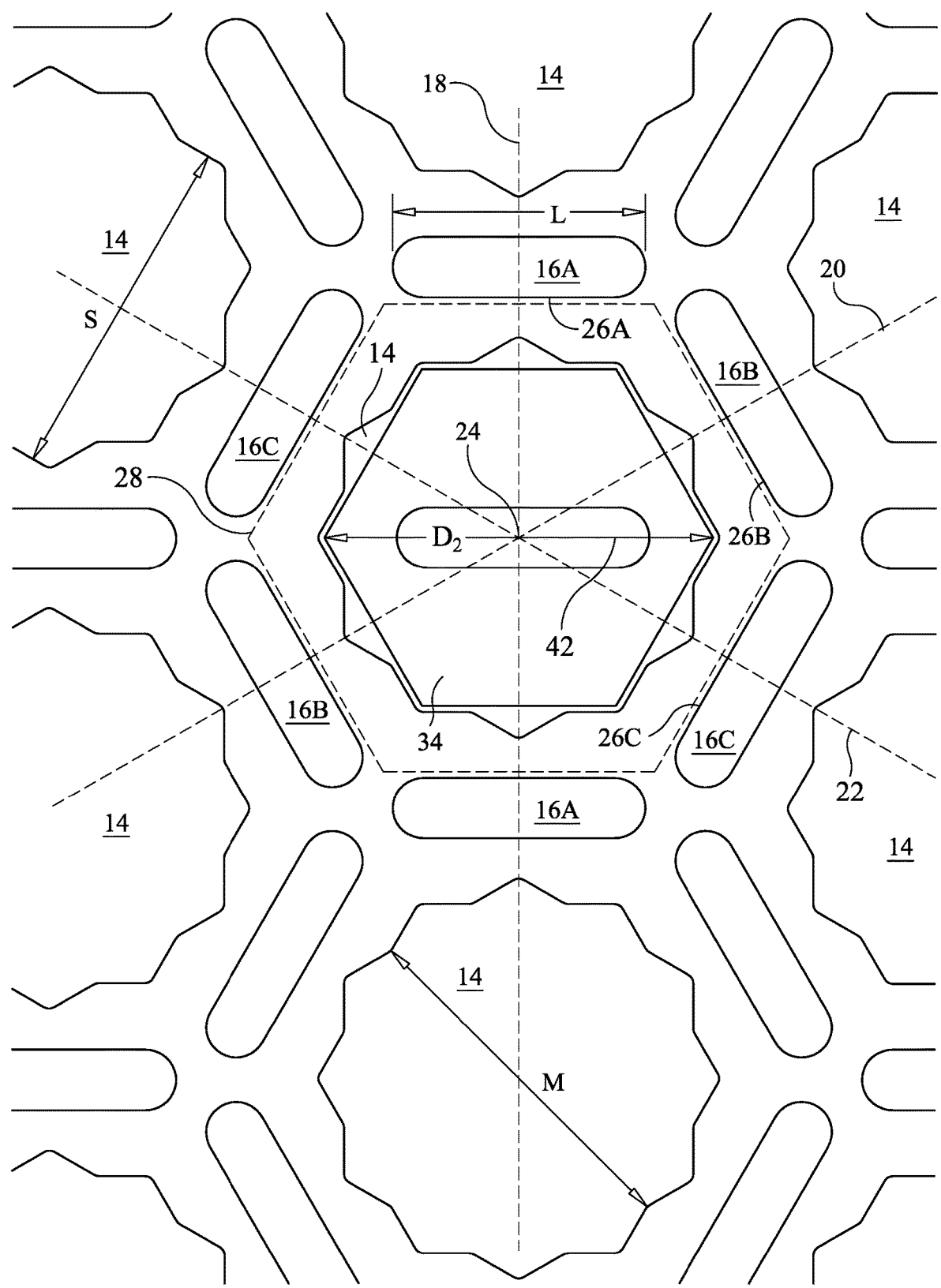
FIG. 2 is a close up of a portion of the attachment member of FIG. 1
Figure 3:
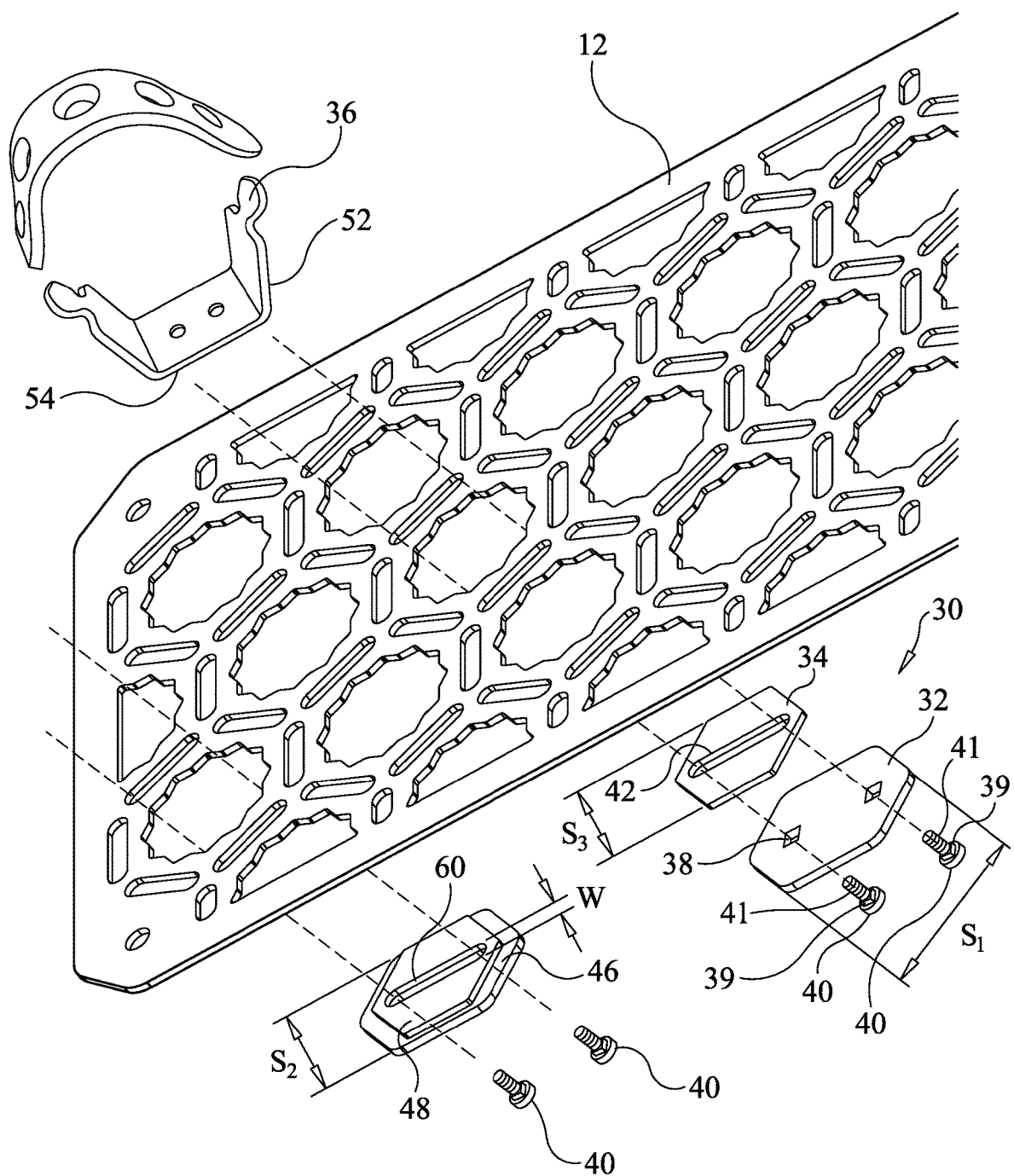
FIG. 3 is a perspective view of a portion of the attachment member of FIG. 1 and amounting system incorporating features of the present invention.
Figure 4:
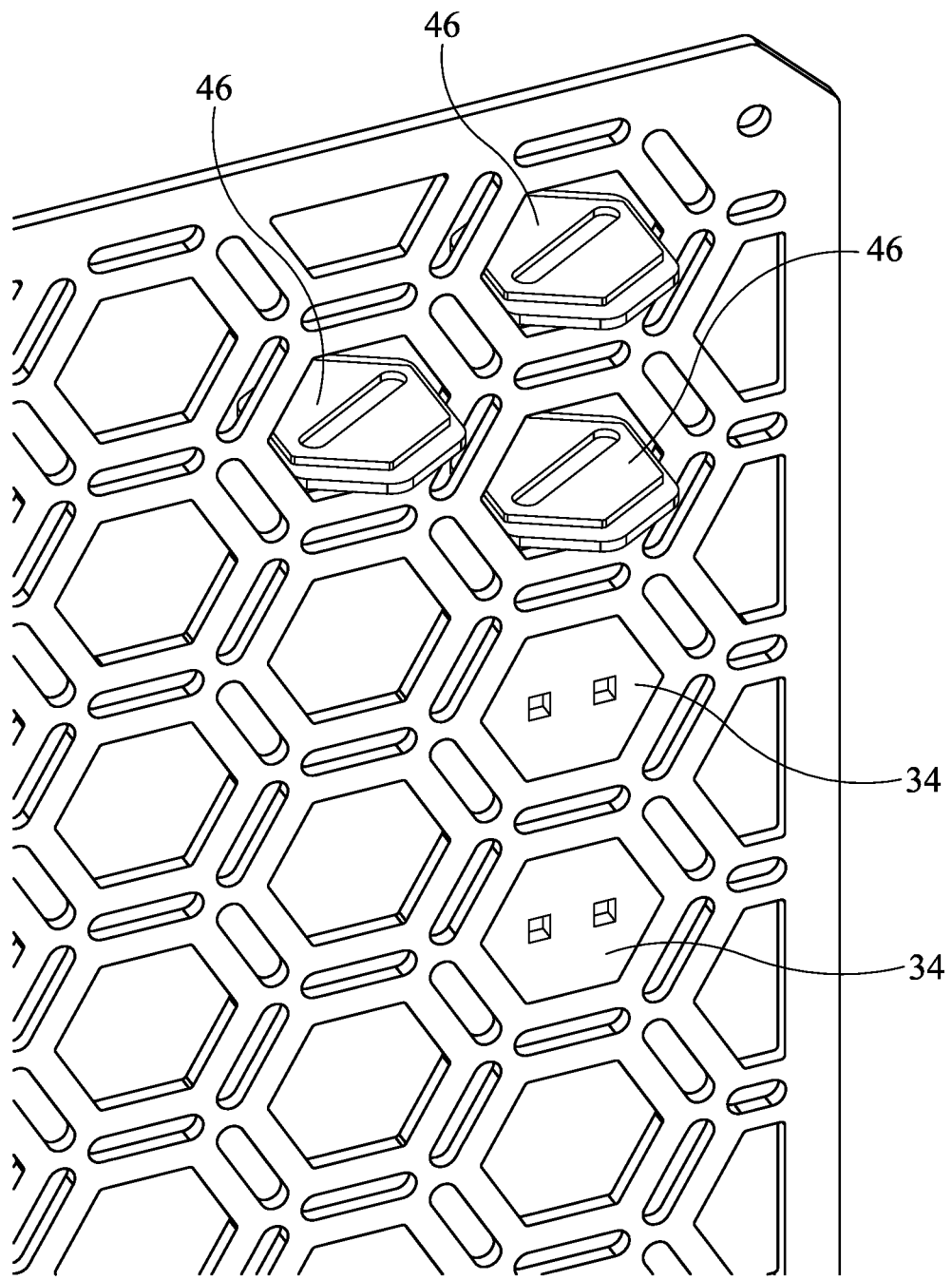
FIG. 4 is a portion of an alternative embodiment of an attachment member and mounting system incorporating features of the present invention.

With reference to the figures, and in particular FIGS. 1-3, a MOLLE compatible modular mounting system 10 incorporating features of the present invention comprises an attachment member 12, which in the illustrative embodiment comprises a rigid or semi-rigid flat panel. Attachment member 12 may be formed of any suitable rigid or semi-rigid material including plastic, metal or composite materials, but in the illustrative embodiment attachment member 12 comprises a sheet of aluminum alloy 0.125 inch (3.175 mm) thick.

Figure 5:
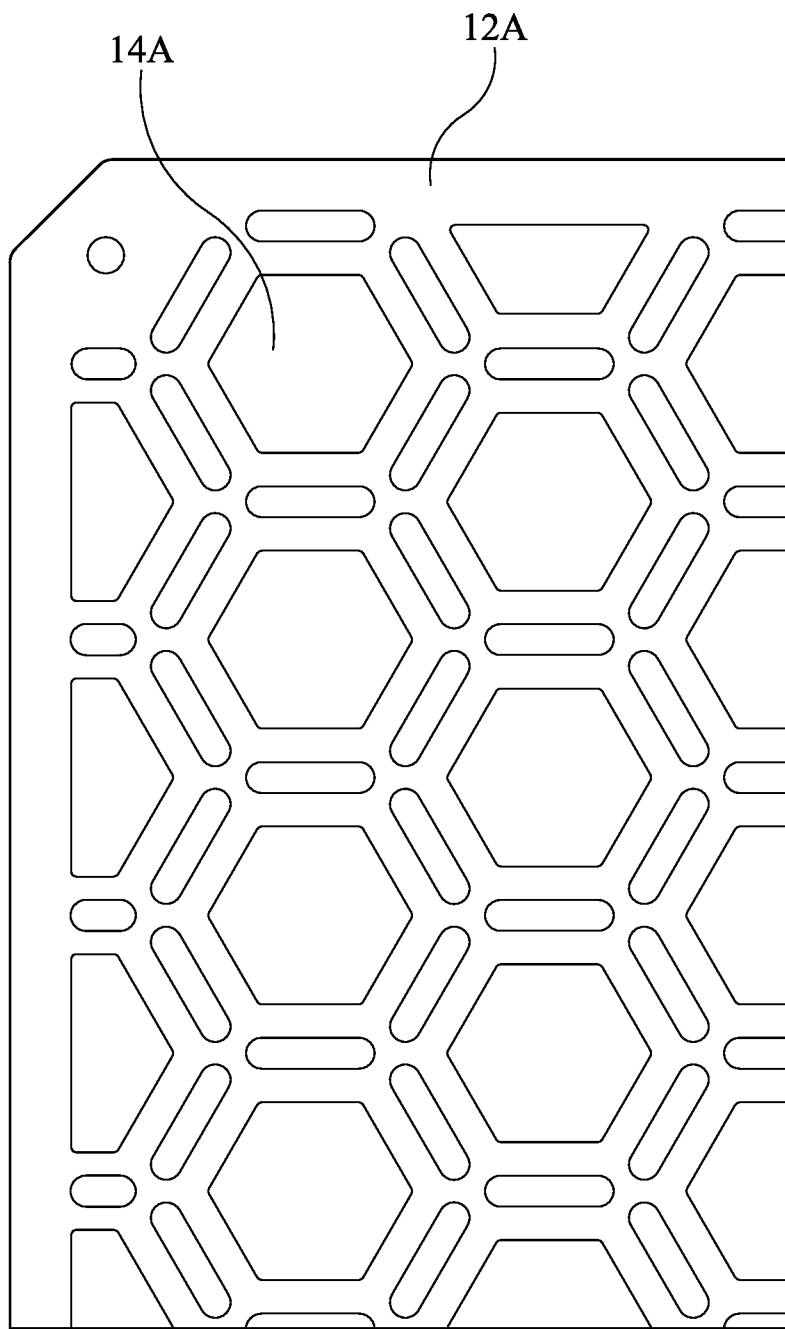
FIG. 5 is a front view a portion of the attachment member of FIG. 4.
Figure 6:
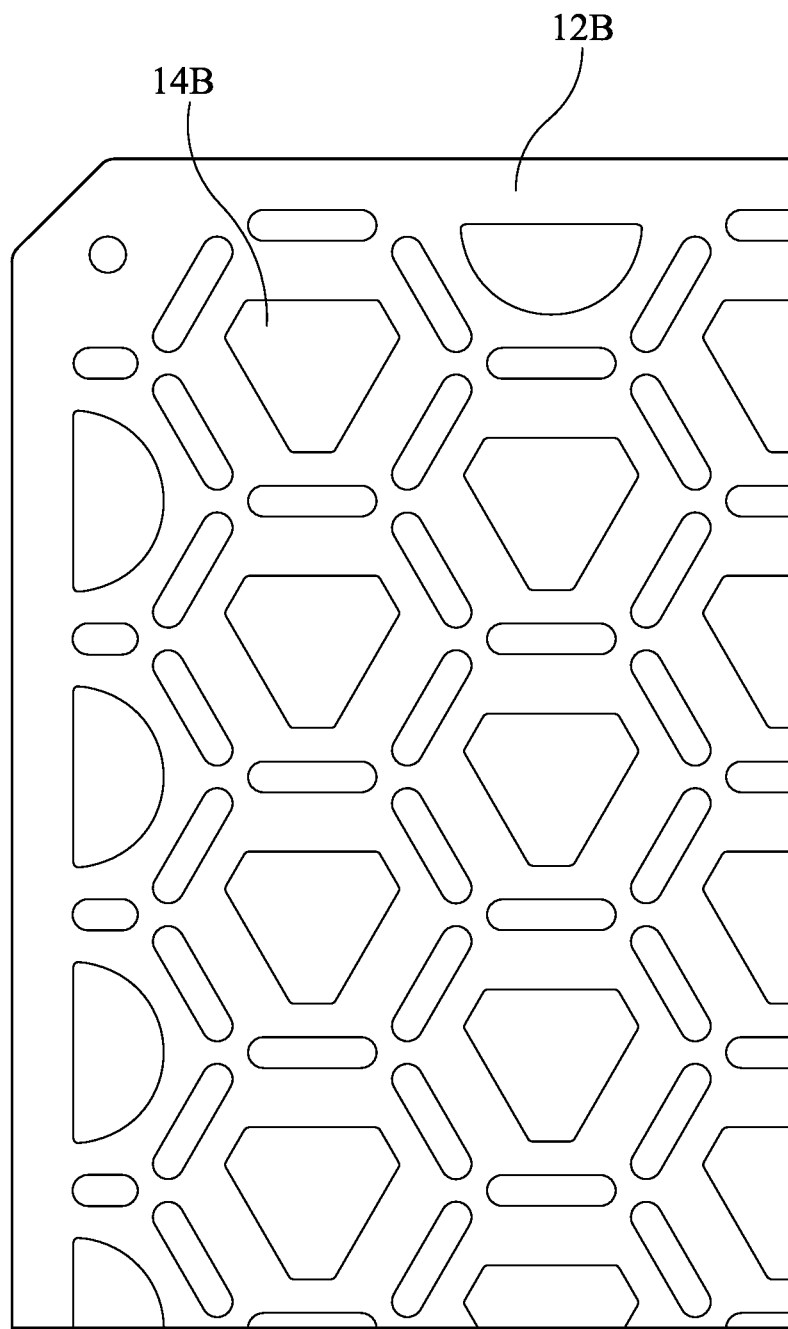
FIG. 6 is a front view of a portion of another alternative embodiment of attachment member.
Figure 7:
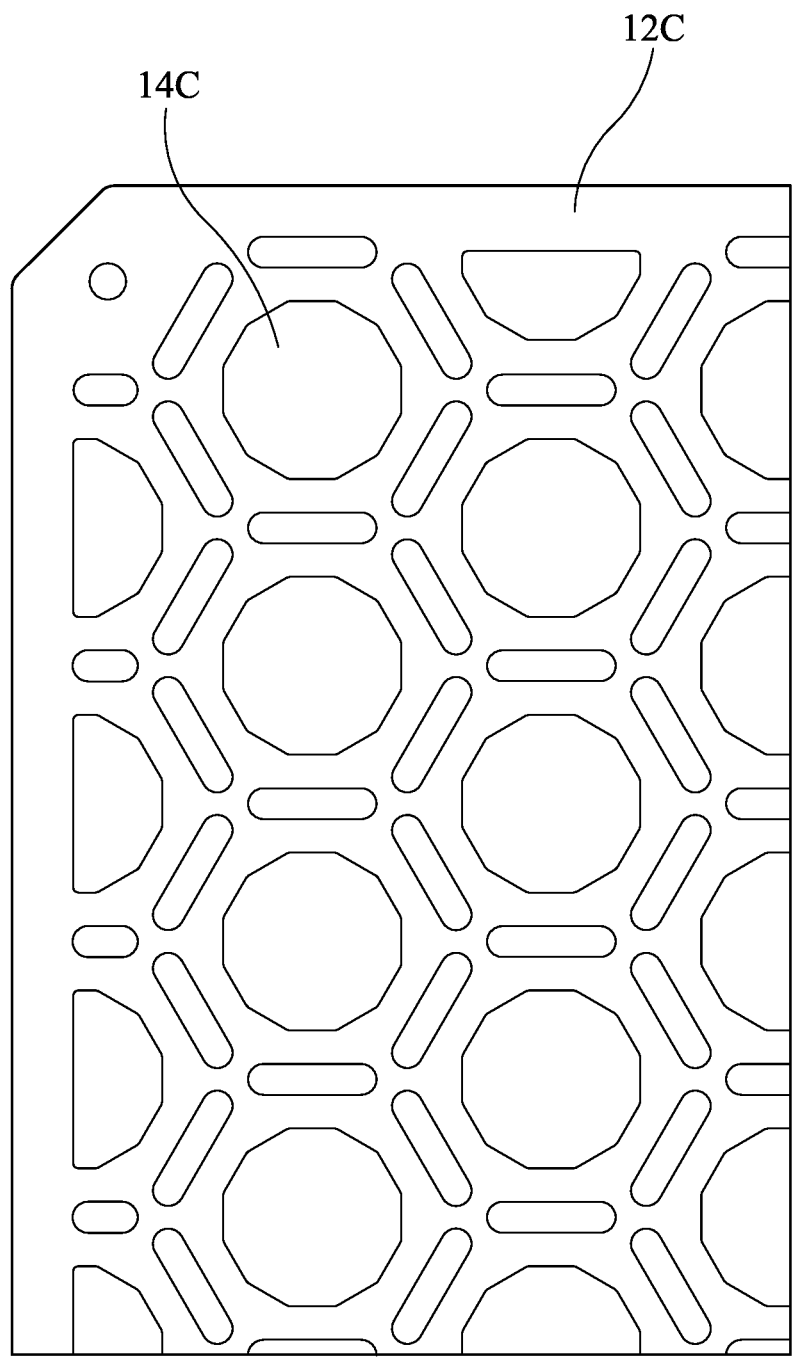
FIG. 7 is a front view of a portion of another alternative embodiment of attachment member.

Attachment member 12 may include a number of primary apertures or openings 14 and a number of secondary apertures or openings 16A, 16B and 16C. Primary apertures 14 are arranged in a linear array, for example along a vertical axis 18 extending from the center 24 of primary aperture 14. Additional primary apertures 14 may be oriented along an axis 20 rotated 60° relative to vertical axis 18 and/or along an axis 22 rotated an additional 60° relative to axis 20. In the illustrative embodiment this results in primary apertures 14 being disposed in a repeating hexagonal array. Primary apertures 14 each preferably comprise a regular polygon having at least three planes of symmetry oriented along vertical axis 18, axis 20 and axis 22. Primary apertures 14 preferably each have a diagonal dimension "D" that is at least as long as the width of a standard PALS webbing (e.g. 25.4 mm). In the illustrative embodiment, primary apertures 14 comprise 12-point rotated hexagon apertures, however other regular polygon apertures may be incorporated without departing from the scope of the invention. For example, attachment member 12A may comprise hexagonal apertures 14A; attachment member 12B may comprise triangular apertures 14B; or attachment member 12C may comprise dodecagon apertures 14C as shown in FIGS. 5-7 without departing from the scope of the invention.

With particular reference to FIG. 2, secondary apertures 16A, 16B and 16C each comprise an elongated slot having a length dimension "L" that is at least as long as the width of a length of standard PALS webbing (e.g. 25.4 mm). Secondary apertures 16A, 16B and 16C are disposed between each adjacent primary aperture 14 so that each primary aperture 14 is separated from an adjacent primary aperture 14 by a secondary aperture 16A, 16B or 16C. Secondary apertures 16A, 16B and 16C are preferably centered along each of axes 18,20, and 24 with the long edges 26A, 26B and 26C nearest to primary aperture 14 facing the center 24 of primary aperture 14, i.e. the long edge 26A of secondary aperture 16A is transverse to axis 18, the long edge 26B of secondary aperture 16B is transverse to axis 20, and the long edge 26C of secondary aperture 16C is transverse to axis 22. The intersection of the long edges 26A, 26B and 26C create a hexagonal perimeter 28 the purpose of which will be explained in further detail hereinafter.

With additional reference to FIG. 3, adapter 30 comprises a backing member 32, an indexing member 34 and a front member 36. In the illustrative embodiment, backing member 32 comprises a flat panel with a substantially regular hexagonal profile having an across flat dimension "S1" that is larger than the across flat dimension "S" of primary aperture 14. This ensures that backing member 32 will not pass-through primary aperture 14 when placed flat against attachment member 12. Backing member 32 may be any size or shape. Preferably, however, backing member 32 is of a size and shape that will fit within the outline of hexagonal perimeter 28 so that secondary apertures 16A, 16B and 16C are not obscured when backing member 32 is in place. Most preferably, backing member 32 is sized so that its across flat dimension S1 is less than the diagonal dimension "D" of primary aperture 14 so that backing member 32 will pass through primary aperture 14 when inserted edgewise through primary aperture 14. Backing member 32 may incorporate one or more openings 38, which may be threaded, slotted or other shapes, but in the illustrative embodiment openings 38 comprise square holes adapted to accept the square shanks 39 of conventional carriage bolts 40.

In the illustrative embodiment, indexing member 34 comprises a flat panel with a substantially regular hexagonal profile having an across flat dimension "S3" that is smaller than the across flat dimension "S" of primary aperture 14. Indexing member has a diagonal dimension "D2" that is larger than the minimum diagonal dimension "M" of primary aperture 14. This ensures that that the outside edges 33 of indexing member 34 will engage the inside edges 15 of primary aperture 14 to prevent indexing member 34 from rotating when it is within primary aperture 14. Indexing member 34 may include one or more openings 42, which may be threaded, rectangular or other shapes, but in the illustrative embodiment opening 42 comprises an elongated slot adapted to clear the round shank portion 41 of carriage bolts 40. Although the indexing member 34 in the illustrative embodiment is a regular hexagonal shape, other shapes including 12-point rotated hexagon, rectangular or other geometric shapes may be employed without departing from the scope of the invention, provided the engagement between indexing member 34 and primary aperture 14 prevents indexing member 34 from rotating relative to attachment member 12.

In the illustrative embodiment, front member 36 comprises a rifle barrel clamp comprising a flattened V-shaped bracket 52 having a base 54 that is larger than the side dimension "S" of primary aperture 14. This ensures that front member 36 will not pass through primary aperture 14 when base 54 is placed flat against attachment member 12. adapter 30 may be assembled to attachment member 12 to create a rigid mounting point by inserting carriage bolts 40 through apertures 38 and placing backing member 32 against the appropriate primary aperture 14. Indexing member 34 is then placed within primary aperture 14 in the desired orientation with carriage bolts 40 protruding through indexing member 34. Front member 36 is then placed over indexing member 34 and secured with conventional threaded nuts (not shown) so that indexing member 34 is sandwiched between backing member 32 and front member 36. Indexing member 34 is preferably thinner than the 0.125-inch (3.175 mm) thickness of attachment member 12 so that front member 36 and backing member 32 clamp tightly against attachment member 12. Although front member 36 in the illustrative embodiment comprises a rifle barrel clamp, in practice, front member 36 may comprise other shapes, as the particular application may require without departing from the scope of the invention.

An alternative adapter 44 comprises a backing member 46 with an integral indexing member 48 comprising a raised area that protrudes from the surface of backing member 46. As with backing member 32, backing member 46 has a substantially hexagonal profile that is smaller than hexagonal perimeter 28 and preferably has a side "S2" that is smaller than diagonal dimension "D" of primary aperture 14 so that backing member 46 can be inserted through primary aperture 14 edgewise. Backing member 46 may include one or more openings 50, which may be circular, threaded, rectangular, or other shape but in the illustrative embodiment comprises an elongated slot having a width dimension "W" that is sized to key on the square shanks of conventional carriage bolts 40. Assembly and function of adapter 44 is similar to that of adapter 30 and therefore will not be discussed in detail herein. Additionally, the positions of backing member 46 and front member 36 may be reversed during assembly so that backing member 46 is on the front side of attachment member 12. Threaded apertures or similar features on backing member 46 would then be employed to mount equipment to backing member 46.

Figure 8:
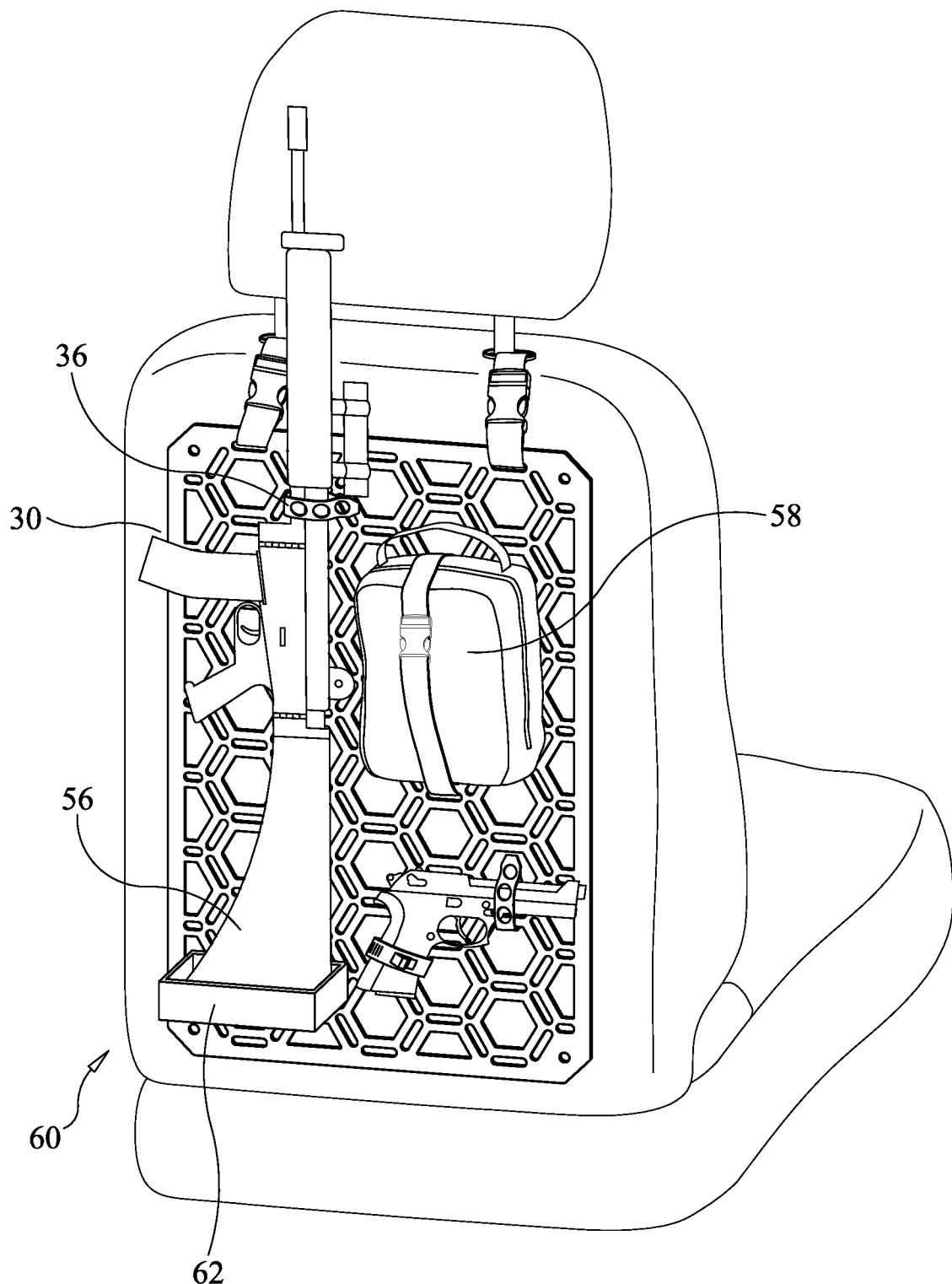
FIG. 8 is a perspective view of an attachment member and mounting system attached a vehicle seat.

As shown in FIG. 8, attachment member 12 may be secured to the front seat of a vehicle to provide a modular mounting system to secure, for example, a rifle 56 as well as a PALS compatible soft pouch 58. The rifle 56 is rigidly attached to attachment member 10 by mounting systems 30 which comprises at the barrel end, a front member 36 securing the rifle barrel and at the rifle butt end a front member 60 comprising a rifle butt stock receiver 62. In the illustrative embodiment, soft pouch 58 is secured to attachment member 12 by threading the PALS compatible straps of soft pouch 58 through secondary apertures 16A, 16B or 16C.

Although certain illustrative embodiments and methods have been disclosed herein, it will be apparent from the foregoing disclosure to those skilled in the art that variations and modifications of such embodiments and methods may be made without departing from the invention, for example although in the illustrative embodiment attachment member 12 is secured to the front seat of a vehicle, attachment member may be secured to a rigid surface such as the interior of a truck bed. It should also be observed that in some cases, the minimum diagonal dimension of a primary aperture 14 will be equal to the across flat dimension of the primary aperture 14, for example if primary aperture 14 is a hexagon. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within +10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____").

The invention claimed is:

1. An adapter for use with an attachment member of a MOLLE compatible mounting apparatus, the attachment member having a front face with a first plurality of primary apertures each of the first plurality of primary apertures comprising a substantially identical polygonal opening having at least three axes of symmetry, the first plurality of primary apertures being disposed in a first repeating linear array across at least a portion of the attachment member, the adapter comprising: a backing member, a separate indexing member and a separate front member, the indexing member comprising a flat panel having a polygonal outline that is sized to fit within any one of the first plurality of primary apertures with the outside edges of the indexing member engaging the inside edges of said one of the first plurality of primary apertures to prevent rotation of the indexing member relative to the attachment member; the backing member indexing member and front member being assembled together to sandwich the indexing member within said one of the first plurality of primary apertures.

2. An adapter for use with an attachment member of a MOLLE compatible mounting apparatus, the attachment member having a front face with a first plurality of primary apertures each of the first plurality of primary apertures comprising a substantially identical polygonal opening having at least three axes of symmetry, the first plurality of primary apertures being disposed in a first repeating linear array across at least a portion of the attachment member, the adapter comprising: a backing member and a front member, the backing member comprising a backing surface having a side that is smaller than a diagonal dimension of one of the first plurality of primary apertures so it can be inserted edgewise through the primary aperture, and an integral indexing member having a polygonal outline that is sized to fit within one of the first plurality of primary apertures with the outside edges of the raised area engaging the inside edges of said one of the first plurality of primary apertures to prevent rotation of the backing member relative to the attachment member; the backing member and front member being assembled together to sandwich the raised area within said one of the first plurality of primary apertures.

3. An adapter for use with an attachment member of a MOLLE compatible mounting apparatus, the attachment member having a front face with first and second pluralities of primary apertures each of the apertures comprising a substantially identical polygonal opening having at least three axes of symmetry, the first plurality of primary apertures being disposed in a first repeating linear array across at least a portion of the attachment member, and the second plurality of primary apertures being disposed in a second repeating linear array across at least a portion of the attachment member, the second repeating linear array having a second axis oriented substantially at 60 degrees relative to the first linear array, the adapter comprising: a backing member, a separate indexing member and a separate front member, the indexing member comprising a flat panel having a polygonal outline that is sized to fit within any one of the first plurality of primary apertures with the outside edges of the indexing member engaging the inside edges of said one of the primary apertures to prevent rotation of the indexing member relative to the attachment member; the backing member indexing member and front member being assembled together to sandwich the indexing member within said one of the primary apertures.

4. An adapter for use with an attachment member of a MOLLE compatible mounting apparatus, the attachment member having a front face with first and second pluralities of primary apertures, each of the apertures comprising a substantially identical polygonal opening having at least three axes of symmetry, the first plurality of primary apertures being disposed in a first repeating linear array across at least a portion of the attachment member, and the second plurality of primary apertures being disposed in a second repeating linear array across at least a portion of the attachment member, the second repeating linear array having a second axis oriented substantially at 60 degrees relative to the first linear array, the adapter comprising: a backing member and a front member, the backing member comprising a backing surface and a raised area having a polygonal outline that is sized to fit within any one of the first plurality of primary apertures with the outside edges of the raised area engaging the inside edges of said one of the first plurality of primary apertures to prevent rotation of the backing member relative to the attachment member; the backing member and front member being assembled together to sandwich the raised area within said one of the first plurality of primary apertures.

* * * * *